United States Patent [19]

Bivins, Jr.

[11] 4,083,707
[45] Apr. 11, 1978

[54] FLOW STABILIZER FOR TUBE AND SHELL VAPORIZER

[76] Inventor: Henry W. Bivins, Jr., 5030 Brummel, Skokie, Ill. 60076

[21] Appl. No.: 676,054

[22] Filed: Apr. 12, 1976

[51] Int. Cl.² .............................................. F17C 7/02
[52] U.S. Cl. ........................................ 62/51; 122/32; 165/158; 165/174
[58] Field of Search ................. 165/158, 174; 122/32; 62/51

[56] References Cited
U.S. PATENT DOCUMENTS

| 452,273 | 5/1891 | Kaiser | 165/174 |
| 872,129 | 11/1907 | Heffley | 165/158 |
| 1,429,149 | 9/1922 | Lawrence | 165/174 |
| 1,557,838 | 10/1925 | Hiller | 165/174 |
| 1,726,020 | 8/1929 | Garvey | 165/142 |
| 2,611,584 | 9/1952 | Labus | 165/142 |
| 3,229,761 | 1/1966 | Ware | 165/142 |
| 3,391,729 | 7/1968 | Wilson | 165/142 |
| 3,395,676 | 8/1968 | Sprague | 122/32 |
| 3,504,739 | 4/1970 | Pearce | 165/158 |
| 3,759,319 | 9/1973 | Ritland | 165/174 |

Primary Examiner—Charles J. Myhre
Assistant Examiner—Margaret A. LaTulip
Attorney, Agent, or Firm—Wegner, Stellman, McCord, Wiles & Wood

[57] ABSTRACT

A flow stabilizer for maintaining parallel channel flow through a multiple tube vaporizer wherein different mass flow rates may occur in the flow of the liquid to be vaporized through the different tubes. The stabilizer includes a plurality of inlet tubes in thermally isolated relationship to the vaporizer and having inner ends extending into the entrance end portions of the vaporizer heat exchanger tubes so as to discharge the incoming liquid to be vaporized inwardly of the entrance end of the exchanger tubes. A flow passage is provided for conducting vaporized liquids from the supply chamber into the heat exchanger tube entrance end portions to prevent choking of the system.

12 Claims, 3 Drawing Figures

U.S. Patent
April 11, 1978
4,083,707
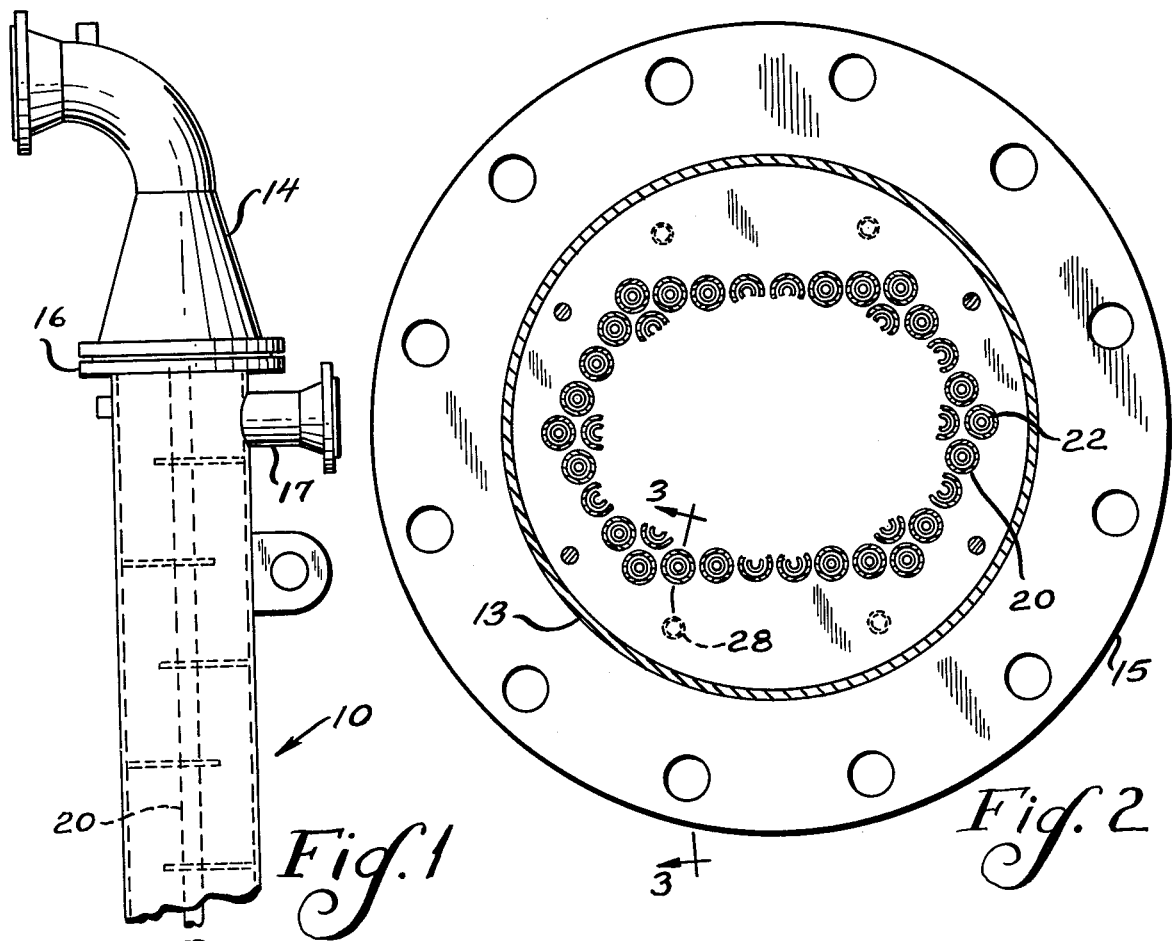
Fig. 1
Fig. 2
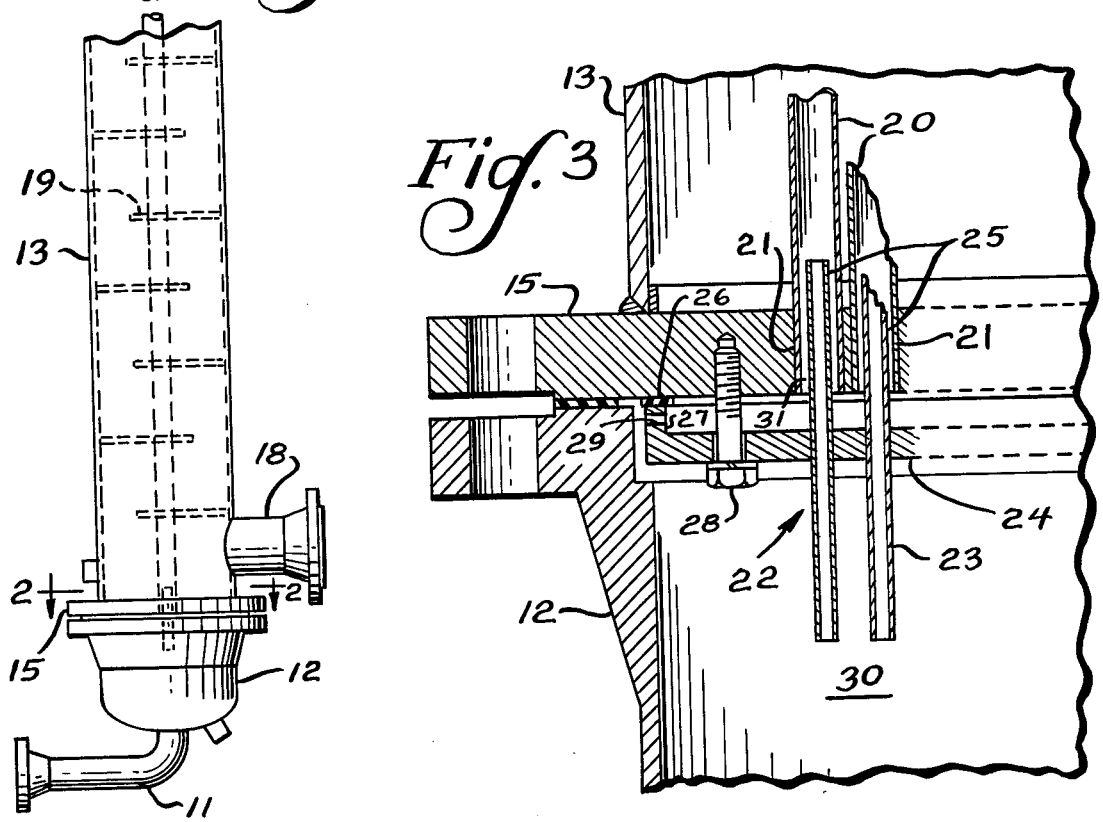
Fig. 3

FLOW STABILIZER FOR TUBE AND SHELL VAPORIZER

BACKGROUND OF THE INVENTION

1. Field of the Invention

This invention relates to vaporizers and in particular to shell and tube vaporizers.

2. Description of the Prior Art

To provide efficient storage of large volumes of fluids, such as oxygen, nitrogen, methane, ethane, propane, natural gas, etc., the fluids are conventionally stored under atmospheric pressure in low temperature, or cryogenic, liquid form. To utilize such fluids in gaseous form, it is necessary to vaporize, or evaporate, the liquid by pumping the liquid from the storage tank to a suitable vaporizer. Such vaporizing raises a number of problems due to the fact that the liquid is originally subcooled whereas the vaporized fluid comprises a superheated gas.

One problem arising from such vaporization has been the difficulty of maintaining even parallel channel flow distribution through the vaporizer heat exchanger tubes. Failure to maintain such an even flow distribution results in reduced capacity of the vaporizer. Further, such failure may cause mechanical problems resulting from the uneven thermal expansion of different portions of the vaporizer.

One conventional use of such vaporizers is in the vaporization of LNG (liquid natural gas).

Conventionally in such vaporizers, the heat exchange fluid is brought to the operating temperature within the vaporizer prior to the introduction of the liquid to be vaporized. The liquid to be vaporized is then pumped from a storage tank wherein it is maintained at a saturated liquid state, thereby boosting the liquid up to system pressure and resulting in a higher saturated temperature. As there is substantially no heat input into the liquid before it is introduced into the vaporizer, the fluid is introduced as a subcooled liquid.

While a small amount of vaporization may occur in the delivery pipes, the subcooled liquid is primarily vaporized when it contacts the heat exchanger tube surfaces within the vaporizer. As these heat transfer surfaces are relatively hot, rapid boiling takes place which causes a mixing of the liquid sufficiently to raise substantially the entire body of liquid to the saturation point. Vigorous evaporation then takes place so as to produce a substantially 100% gaseous fluid output. Superheating of the gas may take place by heat transfer to the gas prior to discharge from the vaporizer.

Nonuniformity of the rate of flow of the fluid through the different heat exchanger tubes of the vaporizer may result in such a system because of the nonlinearity of the pressure drop thereacross which may have a negative slope at some mixture combination. The pressure drop relationship is illustrated in the following curve:

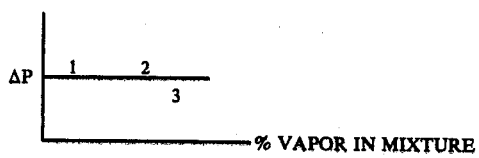

As shown in the pressure drop curve, when the subcooled liquid is introduced into the parallel heat exchange tubes, it is possible to have three different mass flow rates with equal pressure drops notwithstanding the fact that the heat exchange tubes have similar geometry and heat transfer characteristics. More specifically, in the case of a low mass flow rate, a greater amount of vapor is formed, resulting in a decreased mass density. This condition, at a given pressure drop, corresponds to point 3 on the above curve. In the case of a high mass flow rate, less vapor is formed, thereby resulting in an increased mass density illustrated at point 1 on the curve. At an intermediate condition of mass flow, an intermediate mass density results, as shown at point 2 on the curve. As can be seen from the curve, the vapor loads between points 1 and 3 are quite sensitive and somewhat unstable.

In the above described type of vaporizer, the resistance to flow, or pressure drop, across the vaporizer controls the distribution of flow through the individual heat exchanger tubes. As indicated above, at least three separate mass flow rates may exist for a given pressure differential. Thus, the delivery of gas from the vaporizer may be nonuniform with certain portions of the gas having a higher temperature than others.

SUMMARY OF THE INVENTION

The present invention comprehends the provision of new and improved means for equalizing the mass flow of the fluid through the heat exchanger tubes. More specifically, the invention comprehends the provision of improved means for boiling a subcooled liquid by heat exchange thereof with a high temperature fluid.

The invention comprehends the provision of means defining a supply chamber which is thermally isolated from the high temperature portions of the vaporizer and which is arranged to deliver the subcooled liquid through a plurality of inlet tubes into the entrance end portions of the heat exchanger tubes of the vaporizer at a point spaced inwardly of the tube sheet through which the entrance end portions of the heat exchanger tubes may open.

The inlet tubes may be mounted on a carrier so as to be also in thermally isolated relationship to the vaporizer and may extend coaxially through the heat exchanger entrance tube end portions.

Means may be provided for venting any vapor formed in the subcooled liquid prior to its delivery to the heat exchanger tubes. In the illustrated embodiment, the venting means is arranged to deliver the fluid into the entrance end portions of the heat exchanger tube, and more specifically in the illustrated embodiment, the vapor is delivered to the space surrounding the inlet tubes within the heat exchanger tube entrance end portions.

Thus, the invention comprehends providing the subcooled liquid to a supply chamber for uniform distribution thereof through inlet tubes into the heat exchanger tubes at a point spaced from the outer end of the heat exchanger tubes. The wall means defining the supply chamber and the inlet tubes are thermally isolated from the high temperature portions of the vaporizer to permit the vaporization of the subcooled liquid relatively deeply within the heat exchanger tubes.

Thus, the vaporizer means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a broken side elevation of a vaporizer embodying the invention;

FIG. 2 is an enlarged transverse section taken substantially along the line 2—2 of FIG. 1; and FIG. 3 is a further enlarged fragmentary diametric section taken substantially along the line 3—3 of FIG. 2.

DESCRIPTION OF THE PREFERRED EMBODIMENT

In the exemplary embodiment of the invention as disclosed in the drawing, a vaporizer generally designated 10 is provided for vaporizing low temperature liquids as a result of a heat exchange from a higher temperature fluid. In the illustrated embodiment, the vaporizer is adapted to vaporize LNG (liquid natural gas). The LNG comprises a cryogenic subcooled liquid which may be delivered to the vaporizer from a suitable storage tank or the like (not shown) by means of a suitable pump (not shown) through a delivery duct 11. The delivery duct opens into a header cap 12 provided at one end of a tubular shell 13. At the opposite end of shell 13, the vaporizer is provided with an outlet header 14 which is adapted to provide the vaporized natural gas at system pressure, such as to a natural gas system (not shown).

At its opposite ends, the shell is provided with conventional tube sheets 15 and 16. The tube sheets close the opposite ends of the shell to permit circulation through the shell of suitable high temperature fluid which may be delivered into the shell through an inlet nozzle 17 and from the shell through an outlet nozzle 18. Suitable baffles 19 may be provided extending partially across the shell at longitudinally spaced positions to cause a circuitous flow of the heat exchange fluid through the shell.

The fluid to be vaporized is conducted through the vaporizer within a plurality of heat exchange tubes 20 which open at their opposite ends through the respective tube sheets 15 and 16. Thus, the liquid to be vaporized is effectively boiled within the heat exchange tubes 20 as it flows through the vapirozer to the outlet header 14. The present invention is concerned with the problem of causing a uniform distribution of the flow through the different heat exchange tubes 20 as to optimize the efficiency of vaporization and uniformity of temperature differentials in the system.

More specifically, with reference to FIGS. 2 and 3 of the drawing, the heat exchange tubes 20 define entrance end portions 21 which open through the inlet tube sheet 15. In the conventional vaporizer, the subcooled liquid to be vaporized is delivered directly from the header cap 12 into the heat exchanger tube entrance end portions, and as discussed above, uneven flow distribution may result because of the difference in mass flow rates notwithstanding equal pressure drops from end to end of the heat exchanger tubes. Conventionally, such cryogenic liquids may be delivered at a pressure of approximately 15 p.s.i.g. and delivered from the vaporizer as a gas at 10 p.s.i.g. system pessure. Thus, such systems conventionally comprise relatively low pressure systems.

The present invention comprehends the provision of means generally designated 22 for maintaining equal distribution of the fluid flow through the different heat exchanger tubes for improved efficiency and long life of the vaporizer. The equalizer means herein comprises a plurality of inlet tubes 23 secured by as suitable carrier 24. The inlet tubes define inner ends 25 which extend into the heat exchanger tube entrance end portions 21 to terminate, as best seen in FIG. 3, inwardly of the tube sheet 15.

The inlet tubes 23 are thermally isolated from the high temperature portions of the vaporizer. Thus, as shown in FIG. 3, the inlet tubes 23 may extend coaxially of the heat exchanger tube entrance end portions 21 and have an outer diameter smaller than the inner diameter of end portions 21.

Carrier 24, in turn, is thermally isolated from the high temperature portions of the vaporizer as by means of an insulated gasket 26 disposed between a turned end flange 27 of the carrier and the tube sheet 15. The carrier may be secured to the tube sheet by insulating bolts 28, or the like, which may be suitably accurately located to assure the desired thermally isolated relationship of the inlet tubes 23 to the heat exchanger tube end portions 21.

The carrier may be provided with a vent passage 29 for venting vapor which may be formed in the low temperature liquid within the chamber 30 defined by the header cap 12. Thus, as best seen in FIG. 3, such vapor may flow from chamber 30 into the heat exchanger tube entrance end portions 21 in the annular space 31 surrounding the inlet tube inner ends 25 to be drawn into the liquid discharging into the heat exchanger tubes from the inner ends of the inlet tubes 23. Thus, choking of the inlet of the vaporizer is effectively avoided.

Carrier 24 effectively defines an auxiliary header which is thermally isolated from the high temperature portions of the vaporizer to minimize any premature boiling of the cryogenic liquid and assure the delivery of the liquid to well within the heat exchange tubes 20 before the liquid is placed in heat exchange relationship with the high temperature portions.

It has been found that use of the improved liquid delivery means 22 maintains high uniformity in the flow rate through the individual heat exchanger tubes of the vaporizer thereby maintaining high efficiency in the operation of the vaporizer and minimizing temperature differentials between different heat exchanger tubes.

By separating the low temperature liquid inlet means from the high temperature heat exchange means and delivering the low temperature liquid relatively deeply within the heat exchange tubes of the vaporizer, uniform distribution of the liquid delivery to the different heat exchanger tubes is promoted. Choking of the inlet to the vaporizer is effectively eliminated by the continual venting of any preformed vapor, thereby further assuring the reliability of the vaporizer. As a result of the thermal isolation of the inlet liquid and the venting of any inlet vapor, the small inlet tubes cause a pressure balancing of the inlet liquid at the expected rates of flow with metering on only single phase liquid flow.

The foregoing disclosure of specific embodiments is illustrative of the broad inventive concepts comprehended by the invention.

I claim:

1. In a vaporizer for use with cryogenic liquids having an outer shell, a tube sheet extending across the shell, and a plurality of heat exchange tubes within said shell and defining entrance end portions opening outwardly through said tube sheet, the improvement comprising: a carrier; mounting means for mounting said carrier outwardly adjacent said tube sheet; a plurality of inlet tubes carried by said carrier in thermally isolated relationship to said vaporizer, said inlet tubes having inner ends extending into said heat exchanger tube entrance end portions and outer ends opening to outwardly thereof, said inlet tube inner ends having an inner cross section substantially smaller than the inner cross section of said heat exchanger tube entrance end portions; and wall means defining a supply chamber communicating with said inlet tube outer ends for containing cryogenic liquid to be vaporized, said inlet tube outer ends being constructed to extend into the liquid in said supply chamber during vaporizing operation of said vaporizer and deliver the liquid to be vaporized inwardly through said inlet tubes inner ends into said heat exchanger tube entrance end portions and then through said heat exchanger tubes to have heat transfer with a higher temperature fluid in said shell whereby said inlet tubes cause substantially all said liquid to be vaporized in said tubes inwardly of said entrance end portions thereof.

2. The vaporizer of claim 1 wherein said mounting means includes means for insulatively mounting the carrier to the tube sheet at said one end of the vaporizer.

3. The vaporizer of claim 1 wherein said mounting means includes an insulating gasket disposed between said carrier and the tube sheet.

4. The vaporizer of claim 1 wherein said carrier defines a turned peripheral flange, and said mounting means includes a gasket extending between said carrier flange and the tube sheet.

5. The vaporizer of claim 1 wherein said inlet tube inner ends have a length of approximately two inches within said heat exchanger tube end portions.

6. In a vaporizer having an outer shell, a tube sheet extending across the shell, and a plurality of heat exchange tubes within said shell and defining entrance end portions opening outwardly through said tube sheet, the improvement comprising: a carrier; mounting means for mounting said carrier outwardly adjacent said tube sheet; a plurality of inlet tubes carried by said carrier in thermally isolated relationship to said vaporizer, said inlet tubes having inner ends extending into said heat exchanger tube entrance end portions and outer ends opening to outwardly thereof, said inlet tube inner ends having an outer cross section smaller than the inner cross section of said heat exchanger tube entrance end portions; and wall means defining a supply chamber communicating with said inlet tube outer ends for delivering liquid to be vaporized inwardly through said inlet tubes into said heat exchanger tube entrance end portion and through said heat exchanger tube to have heat transfer with a higher temperature fluid in said shell to cause said liquid to be vaporized in said tubes inwardly of said entrance end portions thereof, said carrier being provided with a through passage for conducting vapor from said supply chamber through the carrier and into said heat exchanger tube entrance end portions about said inner ends of the inlet tubes therein.

7. In a vaporizer having an outer shell, a tube sheet extending across the shell, and a plurality of heat exchange tubes within said shell and defining entrance end portions opening outwardly through said tube sheet, the improvement comprising: a carrier; mounting means for mounting said carrier outwardly adjacent said tube sheet; a plurality of inlet tubes carried by said carrier in thermally isolated relationship to said vaporizer, said inlet tubes having inner ends extending into said heat exchanger tube entrance end portions and outer ends opening to outwardly thereof, said inlet tube inner ends having an outer cross section smaller than the inner cross section of said heat exchanger tube entrance end portions; and wall means defining a supply chamber communicating with said inlet tube outer ends for delivering liquid to be vaporized inwardly through said inlet tubes into said heat exchanger tube entrance end portion and through said heat exchanger tube to have heat transfer with a higher temperature fluid in said shell to cause said liquid to be vaporized in said tubes inwardly of said entrance end portions thereof, said carrier defining a turned peripheral flange, said flange being provided with a through passage for conducting vapor from said supply chamber through the carrier and into said heat exchanger tube entrance end portions about said inner ends of the inlet tubes therein.

8. The vaporizer of claim 1 wherein said inlet tube outer ends extend rectilinearly substantially downwardly from said carrier.

9. The vaporizer of claim 1 wherein said carrier defines an inlet manifold space, said heat exchanger tube entrance end portions opening to said manifold space.

10. The vaporizer of claim 1 wherein said inlet tube inner ends open into said heat exchanger tube entrance end portions coaxially thereof.

11. The vaporizer of claim 1 wherein said inlet tube inner ends open into said heat exchanger tube entrance end portions inwardly of said tube sheet.

12. The vaporizer of claim 1 wherein means are provided for thermally insulating said wall means from said shell, carrier, and tube sheet.

* * * * *